United States Patent [19]

Kugele et al.

[11] Patent Number: 4,711,920

[45] Date of Patent: Dec. 8, 1987

[54] STABILIZERS FOR HALOGEN-CONTAINING POLYMERS COMPRISING THE PRODUCT OF A DIORGANOTIN OXIDE, AN ETHYLENICALLY UNSATURATED DICARBOXYLIC ACID ESTER AND A MERCAPTAN

[75] Inventors: Thomas G. Kugele; Keith A. Mesch; Karl R. Wursthorn; Gary M. Conroy, all of Cincinnati, Ohio

[73] Assignee: Morton Thiokol, Inc., Chicago, Ill.

[21] Appl. No.: 889,323

[22] Filed: Jul. 23, 1986

[51] Int. Cl.$^4$ .................... C08K 5/57; C08K 5/58; C07F 7/22

[52] U.S. Cl. ....................... 524/178; 556/91; 556/92; 556/93; 252/400.1

[58] Field of Search ............... 524/178, 180, 181, 182; 556/91, 92, 93; 252/400.1

[56] References Cited

U.S. PATENT DOCUMENTS

| | | | |
|---|---|---|---|
| 2,267,777 | 12/1941 | Yngve | 260/86 |
| 2,307,157 | 1/1943 | Quattlebaum et al. | 260/86 |
| 2,597,920 | 5/1952 | Carroll | 556/92 |
| 2,641,588 | 6/1953 | Leistner et al. | 260/45.75 |
| 2,746,946 | 5/1956 | Weinberg et al. | 260/45.75 |
| 2,763,632 | 9/1956 | Johnson | 524/178 |
| 2,938,013 | 5/1960 | Mack et al. | 260/45.75 |
| 3,021,302 | 2/1962 | Frey et al. | 260/45.3 |
| 3,063,963 | 11/1962 | Wooten et al. | 524/178 |
| 3,379,679 | 4/1968 | Besso | 524/178 |
| 3,578,621 | 5/1971 | Stapfer | 524/314 |
| 3,640,953 | 2/1972 | Brecker et al. | 524/181 |
| 3,674,737 | 7/1972 | Brecker et al. | 260/45.75 K |
| 3,817,915 | 6/1974 | Kauder et al. | 260/45.75 K |
| 3,928,285 | 12/1975 | Gough et al. | 524/178 |
| 4,111,889 | 9/1978 | Kaneko et al. | 524/314 |
| 4,593,059 | 6/1986 | Mesch et al. | 524/314 |

Primary Examiner—Veronica P. Hoke
Attorney, Agent, or Firm—Richard J. Sheridan

[57] ABSTRACT

Compositions for stabilizing halogen-containing organic polymers against the deteriorative effects of heat, light and weathering and which are non-irritating to eyes and mucous membranes, comprise the reaction product produced by combining an organotin oxide, an ethylenically unsaturated dicarboxylic acid ester and a mercaptan, wherein the chemical equivalence of the mercaptan is less than the chemical equivalence of the diorganotin oxide and the chemical equivalence of the diorganotin oxide is less than the chemical equivalence of the ester compound.

26 Claims, No Drawings

STABILIZERS FOR HALOGEN-CONTAINING POLYMERS COMPRISING THE PRODUCT OF A DIORGANOTIN OXIDE, AN ETHYLENICALLY UNSATURATED DICARBOXYLIC ACID ESTER AND A MERCAPTAN

FIELD OF THE INVENTION

This invention relates to compositions for stabilizing rigid (unplasticized) halogen-containing organic polymers against the deteriorative effects of heat, light and weathering and which are non-irritating to eyes and mucous membranes. The stabilizer comprises the product produced by combining an organotin oxide, an ethylenically unsaturated dicarboxylic acid ester and a mercaptan, wherein the chemical equivalence of the mercaptan is less than the chemical equivalence of the diorganotin oxide and the chemical equivalence of the diorganotin oxide is less than the chemical equivalence of the ester compound. The invention also comprises halogen-containing organic polymers stabilized with such stabilizer compositions and to a process of stabilizing halogen-containing organic polymers with such stabilizer compositions.

BACKGROUND OF THE INVENTION

It has long been recognized that halogen-containing organic polymers, particularly the commercially important polyvinyl chloride polymers, are subject to deterioration or degradation when exposed to the deleterious effects of heat, light and weathering. Various compounds and compositions have been advanced to stabilize these polymers against such deterioration and degradation. For the most part, these stabilizers have been primarily directed toward stabilization against the effects of heat, such as that encountered during processing of the polymer and fabrication into articles. Among these heat stabilizers some of the most effective have been a wide variety of organotin compounds.

For example, organotin oxides and sulfides were suggested by U.S. Pat. No. 2,267,777 Yngve, U.S. Pat. No. 2,746,946 to Weinberg and U.S. Pat. No. 3,021,302 to Frey as heat stabilizers for polyvinyl chloride. However, these compounds are not really very effective heat stabilizers and have never achieved any commercial success.

Numerous patents, such as Kauder et al U.S. Pat. No. 3,817,915, Leistner U.S. Pat. No. 2,641,588 and Brecker et al U.S. Pat. No. 3,640,953 disclose organotin mercaptides and diorganotin mercaptocarboxylic acid esters combined with a diorganotin oxide-ester complex as heat stabilizers for vinyl halide polymers and these have now been generally recognized as among the most effective for inhibiting degradation of polyvinyl chlorides at high temperatures of up to 350° or 375° F. to which they are subjected during processing. However, these mercaptides produce objectionable odors and the polymer often retains some of this odor in the finished product. Moreover, these organotin mercaptide compounds are not effective stabilizers against light and weathering and, in fact, suffer from poor weatherability. It is generally necessary to include more than 10% titanium dioxide pigment in the formulation in an attempt to improve UV resistance. Yet, this is highly undesirable, especially for dark pigmented products.

In U.S. Pat. Nos. 2,597,920 to Caldwell and 2,763,632 to Johnson, it is suggested that reaction products of diorganotin oxides and esters of oxygen-containing acids may be utilized as heat and light stabilizers for polyvinyl chloride resins. However, these reaction products are also rather poor in stabilizing effectiveness and have not been adopted for widespread use.

It has also been suggested in various patents, such as U.S. Pat. No. 2,938,013 to Mack et al and U.S. Pat. No. 2,307,157 to Quattlebaum et al, to employ organotin carboxylates having tetravalent tin atoms which have one or two direct tin to carbon bonds and the remainder of the bonds on the tin being tin to oxygen to carbonyl bonds. While these compounds have been found to be somewhat effective, UV light stabilizers for polyvinyl halide resins are poor heat stabilizers. Moreover, these stabilizers suffer from the drawback that they are primary irritants to the eyes and mucous membranes and the fumes generated during the processing of polyvinyl halide stabilized therewith are lachrymatory. Furthermore, these organotin carboxylates are incompatible with normally used microingredients such as calcium stearate, employed during processing of polyvinyl halide formulations.

A stabilizer composition of an organotin maleate and a maleate ester are disclosed as heat stabilizers for halogen-containing organic polymers in U.S. Pat. No. 3,379,679 but these do not provide adequate heat stability. In addition, such combination is also incompatible with normally used microingredients, employed in commercial polymer formulations, and can cause problems with eye irritation and offensive odors due to the presence of the organotin maleate. Thus, the industry has not been able to use organotin maleates as light stabilizers because of the aforementioned problems.

Yet, with the increasing use of halogen-containing organic polymers for rigid articles which will be exposed to light and outdoor weathering for extended periods of time, such as housing siding and window profiles, it has become increasingly important to develop a stabilizer which will not only protect the polymer against the high temperatures and heat encountered during processing and fabrication but will also protect the polymer against the extended and long-term effect of light and weathering as well.

It is, therefore, highly desirable that a stabilizing composition be provided for halogen-containing organic polymers which is effective as a stabilizer against heat, light and weathering as well as not exhibiting eye and mucous membranes irritation. It is also desirable to provide such a stabilizing composition which provides excellent heat stability for polyvinyl chloride resins rivaling that obtained with organotin mercaptides, while obtaining excellent light and weathering stability similar to that obtained with organotin carboxylates. It would also be highly advantageous to obtain such heat, light and weathering stability while permitting a reduction in the level of titanium dioxide pigment levels to about 3 to 6% or less.

SUMMARY OF THE INVENTION

It has been unexpectedly discovered that drawbacks and disadvantages encountered with the prior art stabilizers for halogen-containing organic polymers can be substantially avoided and still provide excellent heat, light and weathering stability for said polymers when stabilizing compositions are employed which comprise the product of an organotin oxide, an ethylenically unsaturated dicarboxylic acid ester and a mercaptan.

In accordance with this invention there are provided stabilizing compositions capable of stabilizing halogen-containing organic polymers against the deteriorative effects of heat, light and weathering in which said stabilizing compositions comprise the product produced by combining: a diorganotin oxide compound, an ethylenically unsaturated dicarboxylic acid ester compound and a mercaptan containing organic compound, wherein the chemical equivalence of the mercaptan is less than the chemical equivalence of the diorganotin oxide and the chemical equivalence of the diorganotin oxide is less than the chemical equivalence of the ester compound.

Additionally, in accordance with this invention there is provided a composition comprising a halogen-containing organic polymer and, in an amount sufficient to stabilize said polymer against the deteriorative effects of heat, light and weathering, a stabilizer composition comprising the product produced by combining: a diorganotin oxide compound, an ethylenically unsaturated dicarboxylic acid ester compound and a mercaptan containing organic compound wherein the chemical equivalence of the mercaptan is less than the chemical equivalence of the diorganotin oxide and the chemical equivalence of the diorganotin oxide is less than the chemical equivalence of the ester compound. Articles produced from said stabilized polymer compositions are also an aspect of this invention.

There is further provided by this invention a process of stabilizing halogen-containing organic polymers against the deteriorative effects of heat, light and weathering by adding to said halogen-containing organic polymer a stabilizing effective amount of the hereinbefore described stabilizing composition.

DETAILED DESCRIPTION OF THE INVENTION

The stabilizing composition of this invention comprises the product produced by combining about 10 to about 75% by weight of an organotin oxide compound, about 10 to about 75% by weight of an ethylenically unsaturated dicarboxylic acid ester compound and about 5 to about 20% by weight of a mercaptan containing organic compound wherein the chemical equivalence of the mercaptan is less than the chemical equivalence of the diorganotin oxide and the chemical equivalence of the diorganotin oxide is less than the chemical equivalence of the ester compound. A unique tin species is formed from this combination and is not like any known tin-containing species.

The stabilizer compositions of this invention can be produced quite readily. The stabilizer compositions are provided, for example, by combining and mixing an organotin oxide compound and either or both of an ethylenically unsaturated dicarboxylic acid ester compound and a mercaptan containing organic compound and the mixture is heated together at an elevated temperature, generally of up to about 120° C. with stirring, and preferably under reduced pressure in a suitable solvent such as butanol or the like, if necessary, for a period of time sufficient to effect complete reaction and until the reaction mixture becomes uniform. Thereafter, either the ethylenically unsaturated dicarboxylic acid ester compound or the mercaptan containing organic compound, if not added before, can then be added. Preferably, the mercaptan containing organic compound is generally added to this mixture after it has cooled to 70° C. or below. Alternatively, the mercaptan containing organic compound can be added to and mixed with the reaction product of the organotin oxide and ethylenically unsaturated dicarboxylic acid ester prior to or with the addition of the reaction product to the halogen-containing organic polymers so that the polymer processing temperature causes the reaction of the mercaptan compound with the organotin oxide/ethylenically unsaturated dicarboxylic acid ester reaction product. Free ethylenically unsaturated dicarboxylic acid ester component can be provided in the stabilizing composition by adding the excess ethylenically unsaturated dicarboxylic acid ester component either to the reaction mixture with the organotin oxide compound or by adding it to the reaction product after completion of the reaction.

The diorganotin oxides useful in preparing the stabilizing compositions employed in this invention contain organic groups linked to tin only through carbon, and can be represented by the following formula:

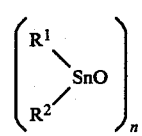

(Formula I)

wherein n is an integer of from 1 to 8 and each compound contains per tin atom two hydrocarbon radicals, $R^1$ and $R^2$, having from about one to about twenty carbon atoms, preferably from about three to about twelve carbon atoms, which can be selected from among alkyl, alkylene, alkenyl, aryl, cycloalkyl, alkylcycloalkyl, arylalkyl,

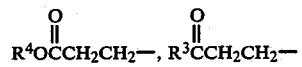

and $N\equiv CCH_2CH_2-$ wherein $R^3$ is selected from alkyl, alkylene, alkenyl, aryl, cycloalkyl, alkylcycloalkyl and aralkyl and $R^4$ is selected from hydrogen and $R^3$. $R^1$, $R^2$ and $R^3$ can, for example, be methyl, ethyl, propyl, isopropyl, n-butyl, isobutyl, tert-butyl, sec-butyl, amyl, hexyl, octyl, 2-ethylhexyl, isooctyl, isononyl, nonyl, decyl, undecyl, lauryl, palmityl, stearyl, myristyl, phenyl, benzyl, cumyl, tolyl, xylyl, cyclobutyl, cyclohexyl, methyl cyclohexyl, and cyclopentyl.

Examples of organotin oxides which can be employed in preparing the stabilizer compositions include, but are not limited to, dimethyltin oxide, diethyltin oxide, dipropyltin oxide, dibutyltin oxide, diamyltin oxide, dioctyltin oxide, didecyltin oxide, dilauryltin oxide, dipropenyltin oxide, diphenyltin oxide, dinaphthyltin oxide, ditolyltin oxide, methylethyltin oxide, phenylbutyltin oxide, dibenzyltin oxide, dixylyltin oxide, dicyclobutyltin oxide, dicyclohexyltin oxide, methylcyclohexyltin oxide, and dicumyltin oxide and the like. Especially preferred is dibutyltin oxide and dioctyltin oxide.

The diesters of ethylenically unsaturated dicarboxylic acids employed in this invention have one carboxyl group on each carbon atom of the ethenylene group. These diesters are represented by compounds having the formulas:

(Formula II)

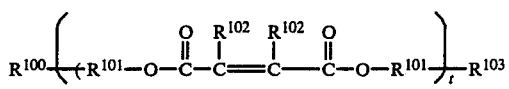

wherein:
- $R^{100}$ and $R^{103}$ are the same or different, and are at each independent occurrence alkyl, alkenyl, cycloalkyl, cycloalkenyl, or a multivalent hydrocarbyl or hydroxyl-substituted hydrocarbyl group such as alkylene, alkenylene, cycloalkylene, cycloalkenylene, alkynylene or tetravalent carbon;
- $R^{101}$ is at each independent occurrence a carbon-oxygen bond, alkylene or alkenylene, with the proviso that the total number of carbon atoms in $R^{100}$ plus $R^{101}$ is from 1 to 10 and to total number of carbon atoms in $R^{103}$ plus $R^{101}$ is from 1 to 10;
- $R^{102}$ is at each independent occurrence selected from hydrogen, alkyl and alkylene (i.e. the alkylene group forms a ring with the —C=C— group); and
- t is an integer, preferably from 1 to about 20, and (Formula III)

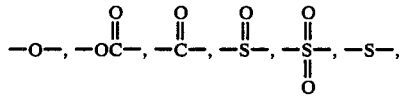

wherein:
- $R^{200}$ has from 1 to 10 carbon atoms and is at each independent occurrence selected from alkyl, alkenyl, cycloalkyl, cycloalkenyl, a multivalent hydrocarbyl group having a valence equal to z′, a multivalent hydroxyl-substituted hydrocarbyl group having a valence equal to z′, and $-R^{201}-Z^{200}-)_{y'}R^{204}$;
- $R^{201}$ is at each independent occurrence selected from alkylene, alkenylene, cycloalkylene, cycloalkenylene, a multivalent hydrocarbyl group and a multivalent hydroxyl-substituted hydrocarbyl group;
- $R^{202}$ is at each independent occurrence selected from hydrogen, alkyl and alkylene (i.e. the alkylene group forms a ring with the —C=C— group);
- $R^{203}$ has from 1 to 10 carbon atoms and is at each independent occurrence selected from alkyl, alkenyl, cycloalkyl, cycloalkenyl and $-R^{201}-Z^{200}-)_{y'}R^{204}$;
- $R^{204}$ is at each independent occurrence selected from hydrogen and alkyl;
- $Z^{200}$ is at each independent occurrence selected from

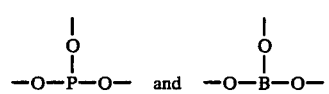

- t′ is zero or an integer from 1 to about 20;
- x′ is zero or an integer from 1 to about 20 with the proviso that if x′=0 or t′=0 then $R^{200}$ is $-R^{201}-Z^{200})_{y'}R^{204}$;
- y′ is an integer from 1 to 10; and
- z′ is an integer from 1 to 4.

It should be noted that the diesters useful in this invention include both the cis and trans isomers.

The diesters useful in accordance with this invention do not function as lubricants in halogen-containing polymer compositions based on rheological testing commonly used in the industry, such as with a Brabender rheometer. The diesters are essentially non-lubricating in that they do not enhance the stability of the halogen-containing polymer by physically modifying the polymer melt. It is believed that this is due to the relatively short chain ($C_1$ to $C_{10}$) alcohol used to prepare the diesters.

Examples of the diesters according to Formula II which are useful in this invention include, but are not limited to, the following compounds which are identified by chemical name or structure: dioctyl maleate, dibutyl maleate, di(2-ethylhexyl) maleate, dibutyl tetrahydrophthalate, methyl cyclohexyl maleate, diallyl maleate, octyl methyl maleate, butyl octyl maleate, diisoctyl maleate, butyl (2-ethylhexyl) maleate, dimethyl maleate, bis(butyl maleate) glycerate, bis(butyl maleate) ethyleneglycolate, bis(butyl maleate) butyleneglycolate, bis(methyl maleate) butyleneglycolate, bis(allyl maleate) butyleneglycolate,

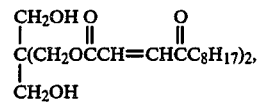

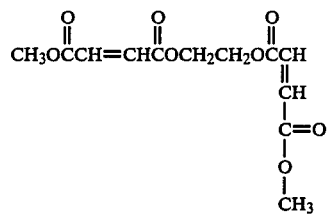

Further examples include the fumarate counterparts to the above maleate diesters. Mixtures of maleate and fumarate diesters (which are commonly formed during the preparation of these diesters) may also be employed.

Examples of the diesters according to Formula III which are useful in this invention include, but are not limited to, the following compounds which are identified by chemical name and/or structure:

diethyleneglycol bis(butyl maleate)

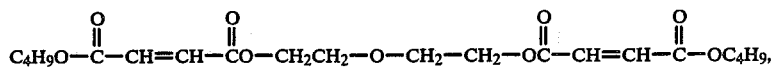

triethylene glycol bis(butyl maleate)

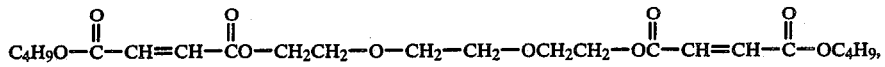

tetraethyleneglycol bis(butyl maleate)

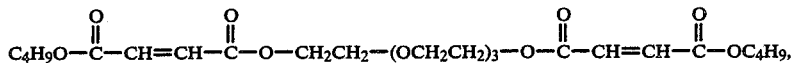

ethyleneglycol glycolate bis(butyl maleate)

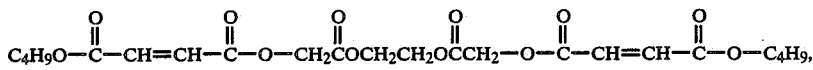

poly(diethyleneglycol maleate) bis(methyl maleate)

where t' is 2 to 20 diethyleneglycol bis(methoxy ethyl maleate)

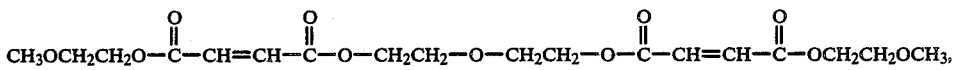

thiodiglycol bis(butyl maleate)

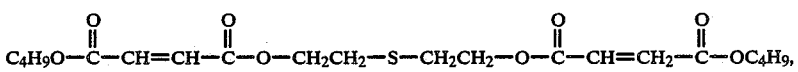

bis(ethyl sulfoxide)-2,2'-bis(butyl maleate)

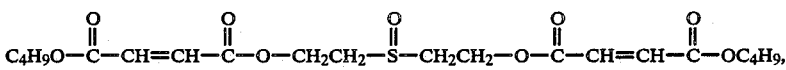

bis(ethyl sulfone)-2,2'-bis(butyl maleate)

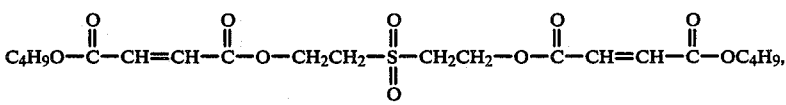

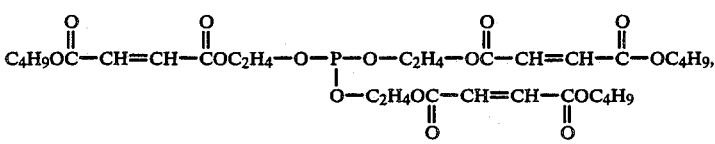

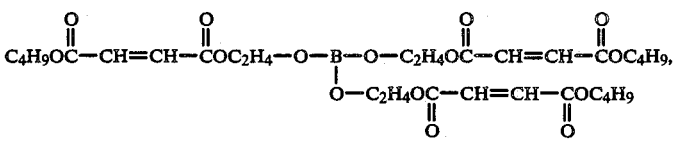

Further examples include the fumarate counterparts to the above maleate diesters. Mixtures of maleate and fumarate diesters (which are commonly formed during the preparation of these diesters) may also be employed.

The diesters which are preferred in the practice of this invention are those according to Formula III where $R^{200}$ is $C_1$ to $C_{10}$ alkyl, $R^{201}$ is $C_1$ to $C_4$ alkylene, $R^{202}$ is hydrogen, $Z^{200}$ is —O—, t' is at least 1 but not more than 20 and x' is at least 1 but not more than 3.

As used in the above formulas and throughout this specification, the term alkyl represents monovalent, straight or branched chain, saturated hydrocarbon radicals containing, for example, 1 to 20 carbon atoms, the term alkylene refers to divalent, straight or branched chain saturated hydrocarbon radicals containing, for example 1 to 20 carbon atoms and the term alkynylene refers to trivalent straight or branched chain saturated hydrocarbon radicals containing, for example, 1 to 20 carbon atoms. The term alkenyl refers to monovalent, straight or branched chain $C_2$ to $C_{20}$ hydrocarbon radicals containing at least one double bond, and the term alkylene refers to divalent $C_2$ to $C_{20}$ hydrocarbon radicals containing at least one double bond. The term cycloalkyl represents monovalent $C_3-C_8$ saturated cycloaliphatic radicals; cycloalkylene refers to divalent $C_3-C_8$ saturated cycloaliphatic radicals; cycloalkenyl refers to monovalent $C_5-C_8$ cycloaliphatic radicals containing at least one double bond; and cycloalkenylene represents divalent $C_5-C_8$ cycloaliphatic radicals containing at least one double bond. The term multivalent hydrocarbyl group refers to groups such as alkylene, alkenylene, cycloalkylene, cycloalkenylene, alkynylene and tetravalent carbon, and the term multivalent hydroxyl-substituted hydrocarbyl group refers to groups such as hydroxyl-substituted alkylene, alkenylene, cycloalkylene, cycloalkenylene alkynylene and tetravalent carbon.

The mercaptan containing organic compounds useful in the practice of this invention may be described by the general formula:

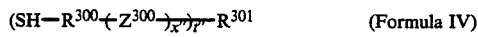   (Formula IV)

wherein $R^{300}$ is alkylene group or

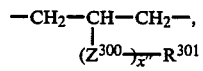

$Z^{300}$ is

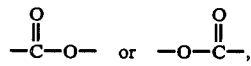

x" is 0 or 1, t" is 1 or 2 and $R^{301}$ is hydrogen, hydroxy, alkyl, alkenyl, cycloalkyl, alkylene, alkenylene, aryl and arylalkyl.

Illustrative of mercapto esters which can be used in this invention there may be mentioned, for example, 2-mercaptoethyl acetate, 2-mercaptoethyl propionate, 2-mercaptoethyl butyrate, 2-mercaptoethyl valerate, 2-mercaptoethyl pivalate, 2-mercaptoethyl caproate, 2-mercaptoethyl caprylate, 2-mercaptoethyl pelargonate, 2-mercaptoethyl decanoate, 2-mercaptoethyl laurate, 2-mercaptoethyl stearate, 2-mercaptoethyl eicosanate, 2-mercaptoethyl palmitate, 2-mercaptoethyl oleate, 2-mercaptoethyl ricinoleate, 2-mercaptoethyl linoleate, 2-mercaptoethyl tallate, 2-mercaptoethyl ester of cottonseed oil acid, 2-mercaptoethyl ester of lard acids, 2-mercaptoethyl ester of coconut oil acids, 2-mercaptoethyl ester of soybean oil acids, 2-mercaptoethyl benzoate, 2-mercaptoethyl p-toluate, 2-mercaptoethyl croton- ate, 2-merrcaptoethyl cinnamate, 2-mercaptoethyl phenyl acetate, 2-mercaptoethyl phenyl propionate, 2-mercaptoethyl methyl maleate, 2-mercaptoethyl ethyl fumarate, 2-mercaptoethyl butyl oxalate, 2-mercaptoethyl methyl oxalate, 2-mercaptoethyl ethyl malonate, 2-mercaptoethyl methyl succinate, 2-mercaptoethyl methyl azelate, 2-mercaptoethyl hexyl azelate, 2-mercaptoethyl methyl phthalate, 3-mercaptopropyl pelargonate, 3-mercaptopropyl enanthate, 3-mercaptopropyl stearate, 3-mercaptopropyl oleate, 3-mercaptopropyl ricinoleate, 3-mercaptopropyl ethyl maleate, 3-mercaptopropyl benzoate, 2-thioglyceryl pelargonate, 3-thioglyceryl pelargonate, 6-mercaptohexyl acetate, 7-mercaptoheptyl acetate, 7-mercaptoheptyl propionate, 8-mercaptooctyl acetate, 8-mercaptooctyl enanthate, 18-mercaptooctadecyl acetate and 18-mercaptooctadecyl enanthate.

As examples of mercapto acids that may be employed in this invention there may be mentioned, for example, mercaptoacetic acid (thioglycolic acid), alpha mercaptopropionic acid, beta mercaptopropionic acid, alpha mercaptobutyric acid, beta mercaptobutyric acid, gamma mercaptobutyric acid, gamma mercapto valeric acid, alpha mercapto valeric acid and beta mercapto valeric acid. There can also be used esters of these acids such as, for example, methyl mercaptoacetate, ethyl mercaptoacetate, butyl mercaptoacetate, isooctyl thioglycolate, methyl beta mercaptopropionate, ethyl beta mercaptopropionate, isopropyl beta mercaptopropionate, octyl beta mercaptopropionate, isooctyl beta mercaptopropionate, 2-ethylhexyl beta mercaptopropionate, decyl beta mercaptopropionate, octadecyl beta marcaptopropionate, allyl beta mercaptopropionate, oleyl beta mercaptopropionate, benzyl beta mercaptopropionate, cyclohexyl beta mercaptopropionate, methyl alpha mercaptopropionate, hexyl alpha mercaptopropionate, nonyl alpha mercaptopropionate, octyl alpha mercaptopropionate, isooctyl alpha mercaptopropionate, stearyl alpha mercaptopropionate, oleyl alpha mercaptopropionate, methyl alpha mercaptobutyrate, octyl alpha mercaptobutyrate, isooctyl alpha mercaptobutyrate, octadecyl alpha mercaptobutyrate, oleyl alpha mercaptobutyrate, ethyl gamma mercaptobutyrate, octyl gamma mercapto butyrate, 2-ethylhexyl gamma mercaptobutyrate, isooctyl gamma mercaptobutyrate, benzyl gamma mercapto butyrate, cyclopentyl gamma mercaptobutyrate, oleyl gamma mercaptobutyrate, isopropyl delta mercaptovalerate, octyl delta mercaptovalerate, isooctyl delta mercaptovalerate, octadecyl delta mercaptovalerate, oleyl delta mercaptovalerate, cyclohexyl delta mercaptovalerate and benzyl delta mercaptovalerate.

As samples of mercaptans useful in this invention there can be mentioned, for example, ethyl mercaptan, butyl mercaptan, octyl mercaptan, dodecyl mercaptan, stearyl mercaptan, oleyl mercaptan, thioglycerol and the like.

Especially preferred as mercaptan containing organic compounds for use in the stabilizing compositions of this invention there can be mentioned, for example, beta-mercaptopropionic acid and isooctyl beta-mercaptopropionate.

For the purpose of this invention, the term "chemical equivalence" is defined as the number obtained by multiplying the moles of a component by the number of reactive groups present in the component.

The halogen-containing organic polymers which are stabilized by the stabilizer compositions of this invention and which are useful in the polymer compositions of this invention include, for example, halogenated polyolefin homopolymers, halogenated polyolfin copolymers, polymer blends containing a halogenated polyolefin homopolymer, or copolymer, vinyl halide homopolymers, vinyl halide copolymers and polymer blends containing vinyl halide homopolymer or copolymers. The vinyl halide homopolymers, vinyl halide copolymers and polymer blends containing vinyl halide homopolymers or vinyl halide copolymers usable in the practice of this invention may be, for example, (1) polyvinyl chloride, polyvinylidene chloride, polyvinyl bromide, polyvinyl fluoride, polyvinylidene fluoride, (2) copolymers of vinyl chloride with a copolymerizable ethylenically unsaturated monomer such as vinylidene chloride, vinyl acetate, vinyl butyrate, vinyl benzoate, diethyl fumarate, diethyl maleate, other alkyl fumarates and maleates, vinyl propionate, methyl acrylate, 2-ethylhexyl acrylate, butyl acrylate, ethyl acrylate, and other alkyl acrylates, methyl methacrylate, ethyl methacrylate, butyl methacrylate hydroxyethyl methacrylate and other alkyl methacrylates, methyl alpha-chloroacrylate, styrene, vinyl ethers such as vinyl ethyl ether, vinyl chloroethyl ether, vinyl phenyl ether; vinyl ketones such as vinyl methyl ketone, vinyl phenyl ketone, 1-fluoro-1-chloroethylene, acrylonitrile, chloroacrylonitrile, allylidene diacetate, chloroallylidene diacetate, ethylene and propylene, and (3) polymer blends such as blends of polyvinyl chloride and polyethylne, polyvinyl chloride and chlorinated polyethylene, polyvinyl chloride and polymethyl methacrylate, polyvinyl chloride and polybutylmethacrylate, polyvinyl chloride and polystyrene, polyvinyl chloride and acrylonitrile-butadiene-styrene copolymer, and polyvinhyl chloride and polyethylene and polymethyl methacrylate. Typical vinyl halide copolymers usable in this invention include vinyl chloride-vinyl acetate (87:13), vinyl chloride-vinylidene chloride (95:5), vinyl chloride-diethyl fumarate (95:5), vinyl chloride-trichloroethylene (95:5) and vinyl chloride-2-dethylhexyl acrylate (80:20). The polymer blends usable in the practice of this invention comprise physical blends of at least two distinct polymeric species and contain from 25 to 95 weight percent of vinyl halide homopolymer. The vinyl halide copolymers usable in the practice of this invention are copolymers comprising from 25 to 95 mole percent vinyl halide units. Of these polymers, the vinyl halide homopolyers are preferred.

The amount of stabilizer composition employed in the halogen-containing organic polymer compositions of this invention can vary considerably. The minimum amount of stabilizer in the polymer composition is that amount which will stabilize the polymer against the deteriorative effects of heat, light and weathering. While this minimum amount can vary depending upon the particular stabilizing composition components employed and their relative amounts, the particular polymer to be stabilized, the severity of the heat, light and weathering to which the polymer will be subjected and the degree of stabilization desired, in general about 1.0% to about 5.0% of stabilizer composition based on the weight of halogen-containing organic polymer will be sufficient to impart the desired properties to the polymer composition in most cases. Amounts greater than this minimum level of stabilizer can, of course, be employed, although at some point the increase in stabilization of the polymer is not commensurate with the additional amount of stabilizer employed. Thus, while there is no critical upper limit to the amount of stabilizer which may be employed, amounts in excess of about 8% do not give an increase in effectiveness which will justify the use of these higher amounts of stabilizer. In fact, amounts above about 8–10% of stabilizer composition may begin to plasticize the polymer and change its physical properties dramatically.

The halogen-containing organic polymer compositions of this invention may be prepared by physically blending the stabilizer composition and the polymer (plus any desired additives) in any convenient manner until the stabilizer composition is thoroughly dispersed throughout the polymer composition. In normal commercial practice this is accomplished by high intensity mixing.

The stabilized polymer compositions of this invention are useful to form a variety of rigid articles of manufacture, e.g. housing siding, window profiles and the like, and are especially useful in those articles which are exposed to light and weathering. A variety of conventional techniques may be employed to shape the polymer composition into the desired article.

The following examples illustrate the present invention. Unless otherwise indicated, all parts and percentages in the examples and throughout this specification are by weight.

EXAMPLE 1

A mixture of 26 parts dibutyltin oxide, 64 parts dibutyl maleate and 10 parts isooctyl-3-mercaptopropionate is heated together at about 100°–120° C. with stirring under reduced pressure in butanol solvent until the reaction mixture becomes homogeneous. The butanol is removed under reduced pressure to produce a non-irritating stabilizer composition of this invention which is designated as Stabilizer Composition A for use in the stabilization testing described hereinafter.

EXAMPLE 2

Employing the procedure of Example 1 a mixture of 26 parts dibutyltin oxide, 69 parts dibutyl maleate and 5 parts 3-mercaptopropionic acid is similarly treated to produce a non-irritating stabilizer composition of this invention which is designated as Stabilizer Composition B for use in the stabilization testing described hereinafter.

EXAMPLE 3

A mixture of 29 parts dibutyltin oxide, 60 parts dibutyl maleate and 11 parts isooctyl mercaptopropionate is heated to a temperature of about 120° C. under reduced pressure and in the absence of a solvent until it becomes homogeneous producing a non-irritating stabilizer composition of this invention which is designated as Stabilizer Composition C for use in the stabilization testing described hereinafter.

EXAMPLE 4

The compositions D through K listed in Table 1 are prepared by reacting the diorganotin oxide compound and ethylenically unsaturated dicarboxylic acid diester compound and subsequently adding thereto the indicated amount of mercaptan containing organic compound and dibutyl maleate compound. Control compositions corresponding to invention compositions D through K, namely Control Compositions 3 through 10, respectively, are identical to the invention composition except for the absence of excess dibutyl maleate.

sation cycle. This was repeated until the plaque had been exposed for 750 hours, samples being taken for

TABLE I

| Component | Control and Stabilizer Composition Parts by Weight | | | | | | | | | | | | | | | |
|---|---|---|---|---|---|---|---|---|---|---|---|---|---|---|---|---|
| | D | 3 | E | 4 | F | 5 | G | 6 | H | 7 | I | 8 | J | 9 | K | 10 |
| Dioctyltin oxide | 46.7 | 46.7 | 49.4 | 49.4 | 41.9 | 41.9 | 52.0 | 52.0 | 43.2 | 43.2 | 40.5 | 40.5 | 49.9 | 49.9 | 39.5 | 39.5 |
| Butyl octyl maleate | 36.7 | 36.7 | | | | | | | | | | | | | | |
| Dibutyl fumarate | | | 31.5 | 31.5 | | | | | | | | | | | | |
| Ethylene glycol bis (butyl maleate) | | | | | 42.4 | 42.4 | | | | | | | | | | |
| Dioctyl maleate | | | | | | | | | 40.7 | 40.7 | | | | | | |
| Butanediol bis (butyl maleate) | | | | | | | | | | | 44.4 | 44.4 | | | | |
| Diethylene glycol bis (butyl maleate) | | | | | | | | | | | | | | | 45.7 | 45.7 |
| Ethylene glycol bis (crotonate) | | | | | | | 28.6 | 28.6 | | | | | | | | |
| Dibutyl maleate | 65.2 | | 69.7 | | 58.8 | | 72.8 | | 60.5 | | 56.6 | | 101.3 | 31.5 | 55.5 | |
| Isooctyl mercaptopropionate | 16.6 | 16.6 | 18.6 | 18.6 | 15.7 | 15.7 | 19.4 | 19.4 | 16.1 | 16.1 | 15.1 | 15.1 | 18.6 | 18.6 | 14.8 | 14.8 |

Examples 5–26 demonstrate the superior heat, light and weathering stabilization of Compositions A through K described in Examples 1 to 4 hereinbefore.

EXAMPLES 5–15

Stabilizer and control compositions indicated in Table I were each in turn blended with a standard poly (vinyl chloride) formulation containing:

| INGREDIENT | PARTS BY WEIGHT |
|---|---|
| Poly (vinyl chloride)-Geon 103 EP sold by B. F. Goodrich (K = 68) | 100.0 |
| Process aid | 1.5 |
| Impact modifier | 6.0 |
| Pigment (TiO$_2$) | Approx 1.0 |
| Paraffin wax | 1.2 |
| Partially oxidized polyethylene | 0.25 |

Each resulting polymer composition was then formed into a plaque and tested for stability to light and weathering by exposing it to ultraviolet light (UV) and moisture in a Q-Panel QUV accelerated weathering tester. Each plaque was weathered at 50° C. by exposing it to 4 hours of UV followed by 4 hours of moisture condensation cycle. This was repeated until the plaque had been exposed for 750 hours, samples being taken for evaluation every 150 hours. The results of these tests are summarized in Table II.

TABLE II

| EXAMPLE NO. | STABILIZER COMPOSITION | PHR | WEATHERING RESULTS (COLOR) TIME (hrs.) | | | | | |
|---|---|---|---|---|---|---|---|---|
| | | | 0 | 150 | 300 | 450 | 600 | 750 |
| Control 1 | dimethyltin dioctylthioglycolate | 1.5 | 10 | 5 | 3 | 2 | 1 | 1 |
| Control 2 | dibutyltin bis (butyl maleate) | 2.5 | 8 | 9 | 9 | 7 | 5 | 5 |
| 5 | Composition A | 4.0 | 10 | 9 | 9 | 7 | 5 | 4 |
| 6 | Composition B | 4.0 | 10 | 9 | 8 | 7 | 5 | 5 |
| 7 | Composition C | 4.0 | 10 | 9 | 9 | 8 | 5 | 4 |
| Control 3 | | 2.3 | 10 | 8 | 6 | 6 | 5 | 5 |
| 8 | Composition D | 3.8 | 10 | 10 | 9 | 8 | 6 | 5 |
| Control 4 | | 2.15 | 10 | 8 | 6 | 6 | 5 | 5 |
| 9 | Composition E | 3.65 | 10 | 10 | 9 | 8 | 6 | 5 |
| Control 5 | | 2.55 | 10 | 9 | 7 | 7 | 5 | 5 |
| 10 | Composition F | 4.05 | 10 | 10 | 9 | 8 | 6 | 5 |
| Control 6 | | 2.06 | 10 | 9 | 6 | 5 | 5 | 4 |
| 11 | Composition G | 3.56 | 10 | 10 | 10 | 7 | 6 | 5 |
| Control 7 | | 2.48 | 10 | 9 | 7 | 6 | 5 | 5 |
| 12 | Composition H | 3.98 | 10 | 10 | 10 | 7 | 6 | 5 |
| Control 8 | | 2.65 | 10 | 10 | 10 | 7 | 6 | 5 |
| 13 | Composition I | 4.15 | 10 | 10 | 10 | 8 | 8 | 5 |
| Control 9 | | 2.15 | 10 | 8 | 6 | 6 | 5 | 5 |
| 14 | Composition J | 3.65 | 10 | 10 | 9 | 8 | 6 | 5 |
| Control 10 | | 2.7 | 10 | 8 | 6 | 6 | 5 | 4 |
| 15 | Composition K | 4.2 | 10 | 10 | 9 | 7 | 7 | 5 |

The above results demonstrate that:

1. Organotin-sulfur compounds are poor weathering stabilizers as shown by Control 1 which discolors severely after only about 150 hrs. of accelerated weathering.

2. Alkyltin carboxylates are adequate weathering stabilizers, as demonstrated by Control 2. However, these alkyltin carboxylates are primary irritants to the eyes and mucuous membranes and the fumes generated during processing of the PVC stabilized therewith are lachrymatory. Additionally, such alkyltin carboxylates exhibit incompatibility with microingredients such as calcium stearate.

3. Compositions containing the products of a diorganotin oxide, and ethylenically unsaturated dicarboxylic acid diester and a mercaptan containing organic compound but without excess diester component provide good weathering stabilization to PVC, as shown by Controls 3 through 10.

4. Stabilizers compositions of this invention containing the product of a diorganotin oxide, an ethylenically unsaturated dicarboxylic acid diester and a mercaptan containing organic compound having excess ethylenically unsaturated dicarboxylic acid diester compound present provide an even greater degree of weathering stability to PVC, as demonstrated by Examples 5 through 15 do so without being irritants and without presenting incompatibility problems with PVC microingredients such as calcium stearate.

EXAMPLES 16–26

Stabilizer compositions indicated in Table I were each in turn blended with the same standard poly (vinyl chloride) formulation used for the weathering stability tests.

Each resulting polymer composition was then tested for stability to heat by milling on a two roll dynamic mill at about 180° C. Samples of each composition were taken at 2 minutes intervals of milling and examined for degradation and discoloration. The results are indicated in Table III. Included in the testing were controls corresponding to Compositions D through K of Table I but omitting the organic mercaptan containing component, i.e. being merely the product of the diorganotin oxide and the ethylenically unsaturated dicarboxylic acid ester compound.

containing organic compounds provide excellent heat stability as demonstrated by Examples 16 through 26.

4. However, stabilizer compositions similar to the compositions of Examples 16 through 26 but without the mercaptan-containing organic compound (that is, if only the product of the diorganotin oxide and ethylenically unsaturated dicarboxylic acid ester compound) are ineffective heat stabilizers as demonstrated by Controls D, E, F, G, H, I, J and K.

As an additional example of the preparation of a stabilizer composition of this invention, reference may be made to the preparation set forth in the following example.

EXAMPLE 27

A mixture of 26.76 parts isooctyl mercaptopropionate and 73.24 parts dioctyltin oxide is heated to a temperature of about 120° C. under reduced pressure and in the absence of a solvent until it becomes homogeneous. The resulting mixture is then combined with 150 parts dibutyl maleate to provide a non-irritating stabilizer composition in accordance with this invention.

What is claimed is:

1. A stabilizing composition for stabilizing halogen-containing organic polymers against the deteriorative effect of heat, light and weathering, said composition comprising the reaction product produced by combining:

A. a diorganotin oxide compound containing organic groups linked to tin only through carbon and having the formula:

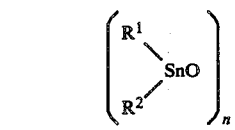

wherein n is an integer of from 1 to 8 and each of $R^1$ and $R^2$, have from about one to about twenty carbon atoms and are selected from the group con-

TABLE III

| EXAMPLE NO. | STABILIZER COMPOSITION | PHR | DYNAMIC MILL RESULTS (COLOR) TIME (Mins) | | | | | | | | | | | | | | |
|---|---|---|---|---|---|---|---|---|---|---|---|---|---|---|---|---|---|
| | | | 2 | 4 | 6 | 8 | 10 | 12 | 14 | 16 | 18 | 20 | 22 | 24 | 26 | 28 | 30 | 34 |
| Control 1 | dimethyltin dioctylthioglycolate | 1.5 | 10 | 10 | 10 | 10 | 10 | 10 | 10 | 10 | 9 | 9 | 9 | 8 | 8 | 7 | 5 | 2 |
| Control 2 | dibutyltin bis (butyl maleate) | 2.5 | 8 | 7 | 7 | 7 | 6 | 6 | 5 | 5 | 4 | 4 | 3 | 2 | 1 | | | |
| 16 | Composition A | 4.0 | 10 | 10 | 9 | 9 | 9 | 9 | 8 | 8 | 8 | 7 | 7 | 5 | 4 | 3 | 2 | |
| 17 | Composition B | 4.0 | 10 | 10 | 9 | 9 | 9 | 9 | 8 | 8 | 8 | 7 | 7 | 5 | 4 | 3 | 2 | |
| 18 | Composition C | 4.5 | 10 | 10 | 10 | 10 | 10 | 10 | 10 | 9 | 9 | 9 | 8 | 8 | 7 | 7 | 5 | |
| Control D | | 1.9 | 7 | 6 | 5 | 5 | 5 | | 3 | | 2 | | 1 | | | | | |
| 19 | Composition D | 2.3 | 10 | 10 | 10 | 10 | 10 | | 9 | | 8 | | 7 | | 6 | | 5 | 1 |
| Control E | | 1.75 | 7 | 5 | 4 | 3 | 1 | | 1 | | | | | | | | | |
| 20 | Composition E | 2.15 | 10 | 10 | 10 | 10 | 10 | | 9 | | 8 | | 7 | | 6 | | 4 | 1 |
| Control F | | 2.15 | 7 | 6 | 5 | 5 | 4 | | 3 | | 2 | | 1 | | | | | |
| 21 | Composition F | 2.55 | 10 | 10 | 10 | 10 | 9 | | 9 | | 8 | | 6 | | 4 | | 1 | |
| Control G | | 1.66 | 7 | 4 | 3 | 2 | 2 | | 3 | | 1 | | | | | | | |
| 22 | Composition G | 2.04 | 10 | 10 | 10 | 10 | 10 | | 9 | | 8 | | 7 | | 5 | | 1 | |
| Control H | | 2.08 | 7 | 6 | 5 | 5 | 5 | | 3 | | 2 | | 1 | | | | | |
| 23 | Composition H | 2.48 | 10 | 10 | 10 | 10 | 10 | | 10 | | 9 | | 8 | | 6 | | 5 | 1 |
| Control I | | 2.24 | 7 | 6 | 5 | 5 | 5 | | 3 | | 2 | | 1 | | | | | ° |
| 24 | Composition I | 2.64 | 10 | 10 | 10 | 10 | 10 | | 9 | | 8 | | 7 | | 6 | | 4 | 1 |
| Control J | | 1.75 | 7 | 5 | 4 | 3 | 1 | | 1 | | 8 | | 7 | | 6 | | 4 | 1 |
| 25 | Composition J | 2.15 | 10 | 10 | 10 | 10 | 10 | | 9 | | 1 | | | | | | | |
| Control K | | 2.3 | 7 | 6 | 5 | 3 | 3 | | 2 | | 8 | | 7 | | 6 | | 4 | 1 |
| 26 | Composition K | 2.7 | 10 | 10 | 10 | 10 | 10 | | 9 | | | | | | | | | |

The heat stability results shown in Table III demonstrate that:

1. Organotin sulfur compounds are excellent heat stabilizers as demonstrated by Control 1, yet are poor weatherability stabilizers as was demonstrated previously by Control 1 in Table II. Yet organotin sulfur compounds produce objectionable odors in the polymer compositions and in the finished products produced therefrom.

2. Organotin carboxylates are poor heat stabilizers as demonstrated by Control 2 and, as discussed hereinbefore, are primary irritants to the eyes and mucous membranes and exhibit incompatibility with microingredients such as calcium stearate.

3. Stabilizing compositions of this invention containing the products of an organotin oxide, an ethylenically unsaturated dicarboxylic acid ester and a mercaptansisting of alkyl, alkylene, alkenyl, aryl, cycloalkyl, alkylcycloalkyl, arylalkyl,

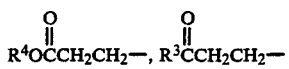

and N≡CCH$_2$CH$_2$— wherein R$^3$ is selected from alkyl, alkylene, alkenyl, aryl, cycloalkyl, alkylcycloalkyl and aralkyl and R$^4$ is selected from hydrogen and R$^3$;

B. an ethylenically unsaturated dicarboxylic acid ester compound having one carboxyl group on each atom of the ethylene group and being selected from the group consisting of compounds of the formulas:

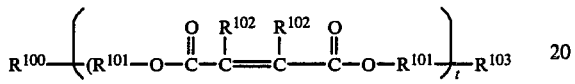

wherein:
R$^{100}$ and R$^{103}$ are the same or different, and are at each independent occurrence alkyl, alkenyl, cycloalkyl, cycloalkenyl, or a multivalent hydrocarbyl or hydroxyl-substituted hydrocarbyl group;
R$^{101}$ is at each independent occurrence a carbon-oxygen bond, alkylene or alkenylene, with the proviso that the total number of carbon atoms in R$^{100}$ plus R$^{101}$ is from 1 to 10 and to total number of carbon atoms in R$^{103}$ plus R$^{101}$ is from 1 to 10;
R$^{102}$ is at each independent occurrence selected from hydrogen, alkyl and alkylene; and
t is an integer of from 1 to about 20, and

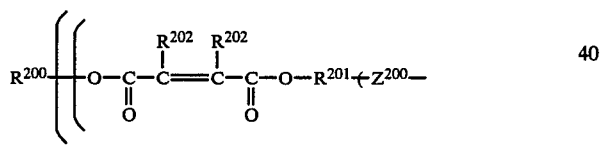

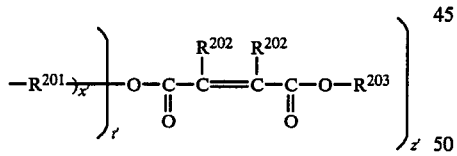

wherein:
R$^{200}$ has from 1 to 10 carbon atoms and is at each independent occurrence selected from alkyl, alkenyl, cycloalkyl, cycloalkenyl, a multivalent hydrocarbyl group having a valence equal to z', a multivalent hydroxyl-substituted hydrocarbyl group having a valence equal to z', and —R$^2$-$_{01}$—Z$^{200}$)$_{y'}$R$^{204}$;
R$^{201}$ is at each independent occurrence selected from alkylene, alkenylene, cycloalkylene, cycloalkenylene, a multivalent hydrocarbyl group and a multivalent hydroxyl-substituted hydrocarbyl group;
R$^{202}$ is at each independent occurrence selected from hydrogen, alkyl and alkylene;
R$^{203}$ has from 1 to 10 carbon atoms and is at each independent occurrence selected from alkyl, alkenyl, cycloalkyl, cycloalkenyl and —R$^2$-$_{01}$—Z$^{200}$)$_{y'}$R$^{204}$;
R$^{204}$ is at each independent occurrence selected from hydrogen and alkyl;
Z$^{200}$ is at each independent occurrence selected from

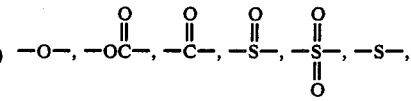

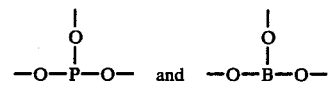

t' is zero or an integer from 1 to about 20;
x' is zero or an integer from 1 to about 20 with the proviso that if x'=0 or t'=0 then R$^{200}$ is —R$^2$-$_{01}$—Z$^{200}$)$_{y'}$R$^{204}$;
y' is an integer from 1 to 10; and
z' is an integer from 1 to 4, and
C. a mercaptan containing organic compound of the formula:

$$(SH-R^{300}(-Z^{300})_{x''})_{t''}-R^{301}$$

wherein R$^{300}$ is alkylene or

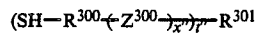

Z$^{300}$ is

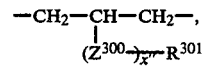

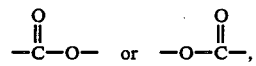

x'' is 0 or 1, t'' is 1 or 2 and R$^{301}$ is hydrogen, hydroxy, alkyl, alkenyl, cycloalkyl, alkylene, alkenylene, aryl and arylalkyl, wherein the chemical equivalence of the mercaptan is less than the chemical equivalence of the diorganotin oxide and the chemical equivalence of the diorganotin oxide is less than the equivalence of the ester compound.

2. The stabilizing composition of claim 1 wherein the stabilizing composition comprises the product of from about 10 to about 75% by weight of a diorganotin oxide, from about 10 to about 75% by weight of ethylenically unsaturated dicarboxylic acid ester compound and from about 5 to about 20% by weight of a mercaptan containing organic compound.

3. The composition of claim 1 wherein the diorganotin oxide compound is a dialkyltin oxide in which R$^1$ and R$^2$ are alkyl groups of from 3 to 12 carbon atoms.

4. The composition of claim 2 wherein the diorganotin oxide compound is a dialkyltin oxide in which R$^1$ and R$^2$ are alkyl groups of from 3 to 12 carbon atoms.

5. The composition of claim 1 wherein the diorganotin oxide compound is selected from the group consisting of dibutyltin oxide and dioctyltin oxide.

6. The composition of claim 2 wherein the diorganotin oxide compound is selected from the group consisting of dibutyltin oxide and dioctyltin oxide.

7. The composition of claim 1 wherein the ethylenically unsaturated dicarboxylic acid ester compound is selected from the group consisting of dibutyl maleate, dioctyl maleate, butyl octyl maleate, dibutyl fumarate, ethylene glycol bis (butyl maleate), ethylene glycol bis (crotonate), butanediol bis(butyl maleate), and diethylene glycol bis (butyl maleate).

8. The composition of claim 2 wherein the ethylenically unsaturated dicarboxylic acid ester compound is selected from the group consisting of dibutyltin maleate, dioctyl maleate, butyl octyl maleate, dibutyl fumarate, ethylene glycol bis (butyl maleate), ethylene glycol bis (crotonate), buanediol bis (butyl maleate), and diethylene glycol bis (butyl maleate).

9. The composition of claim 1 wherein the mercaptan containing organic compound is selected from the group consisting of beta-mercaptopropionic acid, isooctyl mercaptopropionate, isooctyl thioglycolate and thioglycolic acid.

10. The composition of claim 2 wherein the mercaptan containing organic compound is selected from the group consisting of beta-mercaptopropionic acid and isooctyl mercaptopropionate, isooctyl thioglycolate and thioglycolic acid.

11. The composition of claim 2 comprising the product produced by combining about 29% dibutyltin oxide, about 60% dibutyl maleate and about 11% isooctyl mercaptopropionate.

12. The composition of claim 1 comprising the product produced by combining about 43.2% dioctyltin oxide, about 40.7% dioctyl maleate and about 16.1% isooctyl mercaptopropionate.

13. A composition comprising a halogen-containing organic polymer and, in an amount sufficient to stabilize said polymer against the deteriorative effects of heat, light and weathering, a stabilizer composition comprising the reaction product produced by combining:

A. a diorganotin oxide compound containing organic groups linked to tin only through carbon and having the formula:

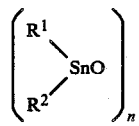

wherein n is an integer of from 1 to 8 and each of $R^1$ and $R^2$, have from about one to about twenty carbon atoms and are selected from the group consisting of alkyl, alkylene, alkenyl, aryl, cycloalkyl, alkylcycloalkyl, arylalkyl,

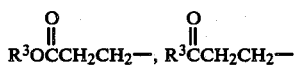

and N≡CCH$_2$CH$_2$— wherein $R^3$ is selected from alkyl, alkylene, alkyenyl, aryl, cycloalkyl, alkylcycloalkyl and aralkyl;

B. an ethylenically unsaturated dicarboxylic acid ester compound having one carboxyl group on each atom of the ethylene group and being selected from the group consisting of compounds of the formulas:

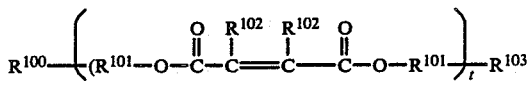

wherein:

$R^{100}$ and $R^{103}$ are the same or different, and are at each independent occurrence alkyl, alkenyl, cycloalkyl, cycloalkenyl, or a multivalent hydrocarbyl or hydroxyl-substituted hydrocarbyl group;

$R^{101}$ is at each independent occurrence a carbon-oxygen bond, alkylene or alkenylene, with the proviso that the total number of carbon atoms in $R^{100}$ plus $R^{101}$ is from 1 to 10 and to total number of carbon atoms in $R^{103}$ plus $R^{101}$ is from 1 to 10;

$R^{102}$ is at each independent occurrence selected from hydrogen, alkyl and alkylene; and t is an integer of from 1 to about 20, and

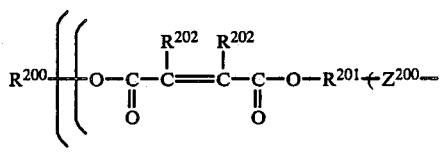

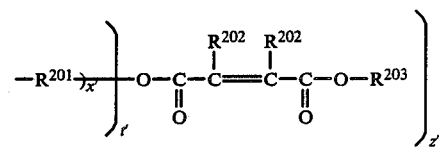

wherein:

$R^{200}$ has from 1 to 10 carbon atoms and is at each independent occurrence selected from alkyl, alkenyl, cycloalkyl, cycloalkenyl, a multivalent hydrocarbyl group having a valence equal to z', a multivalent hydroxyl-substituted hydrocarbyl group having a valence equal to z', and —R$^2$-01—Z$^{200}$)$_{y'}$R$^{204}$;

$R^{201}$ is at each independent occurrence selected from alkylene, alkenylene, cycloalkylene, cycloalkenylene, a multivalent hydrocarbyl group and a multivalent hydroxyl-substituted hydrocarbyl group;

$R^{202}$ is at each independent occurrence selected from hydrogen, alkyl and alkylene;

$R^{203}$ has from 1 to 10 carbon atoms and is at each independent occurrence selected from alkyl, alkenyl, cycloalkyl, cycloalkenyl and —R$^2$-01—Z$^{200}$)$_{y'}$R$^{204}$;

$R^{204}$ is at each independent occurrence selected from hydrogen and alkyl;

$Z^{200}$ is at each independent occurrence selected from

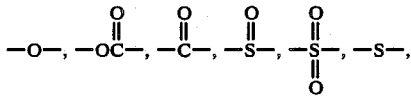

-continued

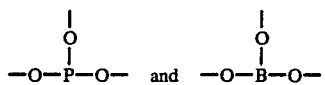

$t'$ is zero or an integer from 1 to about 20;
$x'$ is zero or an integer from 1 to about 20 with the proviso that if $x'=0$ or $t'=0$ then $R^{200}$ is $-(-R^{201}Z^{200})_{y'}R^{204}$;
$y'$ is an integer from 1 to 10; and
$z'$ is an integer from 1 to 4, and C. a mercaptan containing organic compound of the formula:

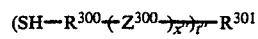

wherein $R^{300}$ is alkylene or

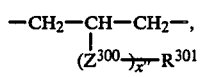

$Z^{300}$ is

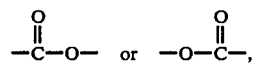

$x''$ is 0 or 1, $t''$ is 1 or 2 and $R^{301}$ is hydrogen, hydroxy, alkyl, alkenyl, cycloalkyl, alkylene, alkenylene, aryl and arylalkyl, wherein the chemical equivalence of the mercaptan is less than the chemical equivalence of the diorganotin oxide and the chemical equivalence of the diorganotin oxide is less than the equivalence of the ester compound.

14. A composition of claim 13 wherein the stabilizer composition comprises the product of from about 10 to about 75% by weight of a diorganotin oxide, from about 10 to about 75% by weight of ethylenically unsaturated dicarboxylic acid ester compound and from about 5 to about 20% by weight of a mercaptan containing organic compound.

15. A composition comprising a halogen-containing organic polymer and, in an amount sufficient to stabilize said polymer against the deteriorative effects of heat, light and weathering, a stabilizer composition of claim 3.

16. A composition comprising a halogen-containing organic polymer and, in an amount sufficient to stabilize said polymer against the deteriorative effects of heat, light and weathering, a stabilizer composition of claim 4.

17. A composition comprising a halogen-containing organic polymer and, in an amount sufficient to stabilize said polymer against the deteriorative effects of heat, light and weathering, a stabilizer composition of claim 5.

18. A composition comprising a halogen-containing organic polymer and, in an amount sufficient to stabilize said polymer against the deteriorative effects of heat, light and weathering, a stabilizer composition of claim 6.

19. A composition comprising a halogen-containing organic polymer and, in an amount sufficient to stabilize said polymer against the deteriorative effects of heat, light and weathering, a stabilizer composition of claim 7.

20. A composition comprising a halogen-containing organic polymer and, in an amount sufficient to stabilize said polymer against the deteriorative effects of heat, light and weathering, a stabilizer composition of claim 8.

21. A composition comprising a halogen-containing organic polymer and, in an amount sufficient to stabilize said polymer against the deteriorative effects of heat, light and weathering, a stabilizer composition of claim 9.

22. A composition comprising a halogen-containing organic polymer and, in an amount sufficient to stabilize said polymer against the deteriorative effects of heat, light and weathering, a stabilizer composition of claim 10.

23. A composition comprising a halogen-containing organic polymer and, in an amount sufficient to stabilize said polymer against the deteriorative effects of heat, light and weathering, a stabilizer composition of claim 11.

24. A composition comprising a halogen-containing organic polymer and, in an amount sufficient to stabilize said polymer against the deteriorative effects of heat, light and weathering, a stabilizer composition of claim 12.

25. A composition according to claim 13 which contains about 1% to about 5% of the stabilizer composition, the percentage being based on the weight of the halogen-containing organic polymer.

26. A composition according to claim 14 which contains about 1% to about 5% of the stabilizer composition, the percentage being based on the weight of the halogen-containing organic polymer.

* * * * *

UNITED STATES PATENT AND TRADEMARK OFFICE
CERTIFICATE OF CORRECTION

PATENT NO. : 4,711,920
DATED : Dec. 8, 1987
INVENTOR(S) : Thomas G. Kugele; Keith A. Mesch; and Karl R. Wursthorn It is certified that error appears in the above-identified patent and that said Letters Patent is hereby corrected as shown below:

Column 5, line 37, "$--R^{201}$" should be -- $-(-R^{201}--$.
Column 5, line 48, "$--R^{201}$" should be -- $-(-R^{201}--$.
Column 5, line 67, "$--R^{2-}$" should be -- $-(-R^{2-}--$.
Column 9, line 11, after "example" insert a comma -,-.
Column 11, line 23, after "methacrylate" insert a comma --,--.
Column 11, line 31, "polyethylne" should be -polyethylene-.
Column 11, line 42, "2-dethylhexyl" should be -2-ethylhexyl-.

Column 17, line 58, "$--R^{2-}$" should be -- $-(-R^{2-}--$.
Column 18, line 1, "$--R^{2-}$" should be -- $-(-R^{2-}--$.
Column 18, line 20, "$--R^{2-}$" should be -- $---R^{2-}--$.
Column 19, line 8, "dibutyltin" should be -dibutyl-.
Column 20, line 44, "$--R^{2}$" should be -- $-(-R^{2}--$.
Column 20, line 56, "$--R^{2}$" should be -- $-(-R^{2}--$.

Signed and Sealed this

Twelfth Day of November, 1991

Attest:

HARRY F. MANBECK, JR.

*Attesting Officer*    *Commissioner of Patents and Trademarks*